(12) United States Patent
Oki et al.

(10) Patent No.: US 6,534,182 B1
(45) Date of Patent: Mar. 18, 2003

(54) FLUORORESIN FILMS, LAMINATE PRODUCED BY USING THE SAME, AND PROCESS FOR PRODUCING LAMINATE

(75) Inventors: Satoshi Oki, Yokohama (JP); Atsushi Hayashi, Yokohama (JP); Makoto Fukawa, Yokohama (JP); Hiroshi Aruga, Kawasaki (JP); Yasuo Hayashi, Yokohama (JP); Shigeaki Yonemori, Aichi (JP); Yukio Jitsugiri, Yokohama (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/381,633
(22) PCT Filed: Mar. 27, 1998
(86) PCT No.: PCT/JP98/01397
§ 371 (c)(1),
(2), (4) Date: Sep. 27, 1999
(87) PCT Pub. No.: WO98/44026
PCT Pub. Date: Oct. 8, 1998

(30) Foreign Application Priority Data

Mar. 28, 1997 (JP) ................................. 9-095006

(51) Int. Cl.[7] .......................... B32B 27/08; B32B 27/36; B32B 27/32; B32B 31/12; B32B 31/28
(52) U.S. Cl. .................... 428/421; 428/480; 156/272.6; 156/274.8; 156/332; 427/490; 427/491; 427/536; 427/540
(58) Field of Search .................... 428/421, 422, 428/480; 150/272.6, 274.8, 332; 427/490, 491, 539, 540, 536

(56) References Cited

U.S. PATENT DOCUMENTS 3,296,011 A * 1/1967 McBride et al. ............ 427/522
4,548,867 A 10/1985 Ueno et al. ................. 428/409
4,549,921 A * 10/1985 Wolfe, Jr. ................. 156/272.6
4,933,060 A 6/1990 Prohaska et al. ....... 204/192.36
5,662,972 A * 9/1997 Shimada et al. ........... 428/35.7
5,846,645 A * 12/1998 Yokota et al. .............. 428/327
6,156,434 A * 12/2000 Hayashi et al. ............. 428/421

FOREIGN PATENT DOCUMENTS

| EP | 0 467 639 | 1/1992 |
| EP | 0 479 592 | 4/1992 |
| EP | 0 644 227 | 3/1995 |
| WO | WO 97/08229 | 3/1997 |
| WO | WO97/08229 | * 3/1997 |

OTHER PUBLICATIONS

Encyclopedia of Polymer Science and Engineering, vol. 9, Metallizing:Sputtering, pp. 598–602, Feb. 1988.*
English translation of WO 97/08229, Mar. 6, 1997.*
Chemical Abstracts, vol. 84, No. 4, Jan. 26, 1976, AN 18660, JP 50 103584, Aug. 15, 1975.
Derwent Publications, AN 1984–278999, JP 59 171649, Sep. 28, 1984.

* cited by examiner

Primary Examiner—Paul Thibodeau
Assistant Examiner—Ramsey Zacharia
(74) Attorney, Agent, or Firm—Oblon, Spivak, McClelland, Maier & Neustadt, P.C.

(57) ABSTRACT

A tetrafluoroethylene-ethylene copolymer (ETFE) film, wherein polar groups are present on the surface of the film after a surface treatment, and the surface roughness $R_a$ is at most the surface roughness $R_a$ of the surface of an untreated film; an ETFE film, wherein polar groups are present on the surface of the film after a surface treatment, and the amount of a weak boundary layer is at most one time of the amount of a weak boundary layer on the surface of an untreated film; a laminate employing such a film having an extremely excellent bonding strength; and a process for producing it with a mass production property.

11 Claims, 6 Drawing Sheets

FLUORORESIN FILMS, LAMINATE PRODUCED BY USING THE SAME, AND PROCESS FOR PRODUCING LAMINATE

TECHNICAL FIELD

The present invention relates to a tetrafluoroethylene-ethylene copolymer (hereinafter referred to as ETFE) film, a laminate employing it and a process for producing the laminate.

BACKGROUND ART

Fluororesins such as ETFE are excellent in chemical resistance and stain resistance. A laminate obtained by laminating a fluororesin film on a substrate such as a metal or a plastic, is used in a wide range of fields including, for example, a floor covering, a copy board, a wall paper, a roof covering, a top plate for gas cooking tables, a gas range hood fan, a surface protecting film and a cover for solar cells. However, to bond a fluororesin film such as an ETFE film on a substrate by an adhesive, a surface treatment which imparts physical and chemical improvements to the surface of the fluororesin is required. This is to improve wettability of the adhesive to the fluororesin having a low surface energy.

As the surface treatment method, a corona discharge treatment has commonly been known. Further, as a method in place of the corona discharge treatment, to improve the bonding property, a process of RF sputtering under conditions of high vacuum and high electric power density (JP-A-51-125455), a process of RF sputtering in a special atmosphere gas (JP-A-6-285988) and a process of RF sputtering for a long period of time (JP-A-6-298971) have been proposed. However, none of ETFE films subjected to the surface treatment by the above-mentioned methods have not had a practically adequate bonding strength.

The object of the present invention is to provide an ETFE film which provides an excellent bonding strength, a laminate employing said ETFE film and a process for producing the laminate.

DISCLOSURE OF THE INVENTION

The present invention provides a surface-treated tetrafluoroethylene-ethylene copolymer film, wherein polar groups are present on the surface of the above-mentioned surface-treated film, and the surface roughness $R_a$ of the surface of the surface-treated film is at most the surface roughness $R_a$ of the surface of an untreated tetrafluoroethylene-ethylene copolymer film.

The present invention further provides a surface-treated tetrafluoroethylene-ethylene copolymer (ETFE) film, wherein polar groups are present on the surface of the above-mentioned surface-treated film, and the amount of fluorine atoms present on the surface of an aluminum thin plate obtained by hot-pressing the aluminum thin plate on the surface of the above-mentioned surface-treated film at 100° C. under a surface pressure of 21 kgf/cm² for 10 minutes, followed by cooling to room temperature and separation, is at most one time of the amount of fluorine atoms present on the surface of an aluminum thin plate obtained by the above-mentioned hot-pressing of the above-mentioned aluminum thin plate on the surface of a surface-untreated tetrafluoroethylene-ethylene copolymer film, followed by cooling to room temperature and separation.

BEST MODE FOR CARRYING OUT THE INVENTION

The present inventors have conducted extensive studies on the relation between the bonding strength and the condition of the surface of the surface-treated ETFE film, and as a result, they have found that a surface-treated ETFE film wherein polar groups are present on the surface of the surface-treated film, and the amount of a weak boundary layer bonded on the surface of the film by a weak bonding strength is small, provides an extremely good bonding strength. The weak boundary layer is composed mainly of oligomers formed by breakage of a polymer. On the surface of a fluororesin film such as an ETFE film, a weak boundary layer (hereinafter referred to as WBL) is present, and the presence of WBL will be a significant impact on a bonding property or an adhesion property. It has been found that such WBL merely bonds with the film substrate by a weak force, and impairs the bonding property or the adhesion property, and it is necessary that the amount of WBL is small for an excellent bonding strength and adhesion strength. Further, it has been found that it is necessary not to increase, preferably to reduce, the amount of WBL present on the surface of the ETFE film before the surface treatment, by the surface treatment, to obtain an excellent bonding strength and adhesion strength.

The present inventors have conducted extensive studies on the relation between the bonding strength and functional groups of the surface-treated ETFE film, and as a result, they have found it preferable that hydroxyl groups and/or carbonyl groups are present, as the polar groups, to impart the bonding property. By the surface treatment of the present invention, an ETFE film wherein hydroxyl groups and carbonyl groups are present on the surface, can easily be obtained.

The surface functional groups on the surface-treated ETFE film can be identified by ESCA (Electron Spectroscopy for Chemical Analysis) method or by a chemical modification method.

Further, as a result of extensive studies on the relation between the bonding strength and the surface roughness of the surface-treated ETFE film, it has been found that an ETFE film wherein the surface roughness of the surface of the surface-treated film is about equal to or less than the surface roughness of the surface of an untreated ETFE film, provides an extremely excellent bonding strength. The surface of the surface-treated ETFE film is preferably under a condition free from significant irregularities (a condition under which corn-like projections are not formed). It is particularly preferred that a crystalline structure under the surface-untreated state is not impaired after the surface treatment.

The surface roughness in the present invention is represented by the arithmetical mean surface roughness $R^a$ (hereinafter referred to simply as $R_a$) as defined by JIS B0601.

In the present invention, $R_a$ was measured by using AFM (Atomic Force Microscope) at non-contact movement dynamic mode. $R_a$ of the ETFE film of the present invention was measured by using AFM. As a result, $R_a$ was equal to or less than the untreated ETFE film. Further, the ETFE film having such $R_a$ of the present invention had an excellent bonding strength and adhesion strength. It has been found that particularly when $R_a$ is at most 10 nm, an excellent bonding strength and adhesion strength can be obtained.

The present invention further provides a laminate which comprises a substrate and the above-mentioned surface-treatment ETFE film laminated on the substrate so that the surface of the surface-treated film faces the substrate. It is particularly preferred that the laminate further has an adhesive for lamination (hereinafter referred to simply as adhesive) between the above-mentioned substrate and the above-mentioned tetrafluoroethylene-ethylene copolymer film, and the above-mentioned substrate and the above-mentioned tetrafluoroethylene-ethylene copolymer film are bonded each other by the above-mentioned adhesive.

By any of the conventional corona discharge treatment, or the above surface treatment method such as a process of RF sputtering under conditions of high vacuum and a high electrical power density (JP-A-51-125455), a process of RF sputtering in a special atmosphere gas (JP-A-6-285988) or a process of RF sputtering for a long period of time (JP-A-6-298971), polar groups can be introduced by the surface treatment. However, by the surface treatment, WBL with an amount of exceeding the amount of WBL on the untreated surface, will form, and the surface having $R_a$ of at least the surface of the untreated film, will be formed.

On the other hand, the present inventors have found that an ETFE film having WBL and $R_a$ in an amount of equal to or less than the untreated ETFE film can be obtained by conducting the surface treatment of the ETFE film by the following method, and the treated ETFE film has an excellent adhesion strength.

Among such surface treatment methods of an ETFE film, preferred is an RF bombard treatment. When radio frequency (RF) voltage is applied between electrodes facing each other under reduced pressure for RF discharge, plasma of diluted air will form in the space between the electrodes. The plasma contains active species such as radical atoms and ions. They collide against the substrate provided on the electrode or provided in the plasma, and may change the condition of the surface of the substrate physically and chemically. RF bombard treatment is a method of utilizing the effect and applying it to an improvement in the condition of the surface. The bombard treatment is a treatment, which is characterized by a weak etching effect due to a mild sputtering, together with an effect of chemically improving the surface by the plasma. The treatment condition varies depending upon e.g. the type of the gas, the gas pressure, the introducing electric power, the distance between the electrodes, and the part at which the substrate is provided.

Further, as the surface treatment method of an ETFE film, a DC (direct current) bombard method is also preferably employed. This is a treatment wherein DC is employed instead of RF in the RF bombard method, and similar effects can be obtained. In the DC bombard treatment, direct current voltage is applied between electrodes facing each other to form plasma, and the surface is physically and chemically changed by utilizing the plasma. In the DC bombard treatment, the apparatus is simple as compared with the RF bombard treatment, whereby the DC bombard treatment is likely to be carried out in a large scale, and it is suitable for mass production. However, a little contrivance is required for apparatus conditions.

According to the RF bombard treatment or the DC bombard treatment, a continuous treatment of roll to roll system can be carried out, whereby the mass production property can be increased.

In the above-mentioned RF bombard treatment and DC bombard treatment, the introducing electric power is preferably an electric power density of from 0.01 to 0.5 W/cm². The treatment time is preferably from 5 to 300 seconds, more preferably from 5 to 60 seconds. These conditions are very weak as compared with the RF sputtering process which has already been reported. However, they are enough for the formation of functional groups on the surface. On the contrary, if the introducing electric power is too strong or the treatment time is too long, damages which are unfavorable for improving the adhesion property may be imparted to the film, such that the surface is excessively impaired, a large amount of WBL will be formed, or the change in the composition may be caused.

The gas to be used in the above-mentioned RF bombard treatment and DC bombard treatment, is not particularly limited so long as it may generate plasma, and it makes polar groups be present on the surface after the surface treatment. To improve wettability of the adhesive to the ETFE film, and to remove WBL, a treatment by a gas containing an inert gas such as He gas, Ne gas, Ar gas, Kr gas or Xe gas, is preferred. A treatment by a gas containing Ar gas is preferred in view of economy, handling efficiency and desired results. Further, by a treatment by a gas containing an oxygen-containing compound such as oxygen, carbon dioxide, carbon monoxide, ozone, water vapor, nitrous oxide or acetone, oxygen-containing functional groups may be imparted to the film, and WBL may be removed, during the bombard treatment, whereby the bonding strength will improve. Further, with a purpose of forming nitrogen-containing functional groups, by a treatment by a gas containing a nitrogen-containing compound such as nitrogen, nitrogen dioxide, nitrogen monoxide or ammonia, polar groups may be formed, and WBL may be removed.

By conducting the RF bombard treatment or the DC bombard treatment under the above-mentioned mild conditions, an ETFE film having the surface shape of the surface of a surface-untreated film maintained, having $R_a$ of equal to or less than the untreated ETFE film, having polar groups on the treated surface, and having an extremely small amount of WBL, can be obtained. The ETFE film thus surface-treated, provides an extremely excellent bonding strength and adhesion strength.

By combining with an adhesive, a laminate having a very high bonding property which is practically adequate, and a surface which is excellent in water-vapor resistance, can be obtained. Further, a laminate having an adequate adhesion strength with a film having a large amount of polar groups such as EVA, can be obtained without using an adhesive.

The improvement in the bonding strength or the adhesion strength is considered to be attributable to the fact that C—H bonds, C—F bonds or C—C bonds on the surface of ETFE are cut by the surface treatment, and they react with e.g. water or oxygen when they are exposed in the air to form polar groups such as hydroxyl groups or carbonyl groups, and they remove WBL present on the surface without generating irregularities on the surface or newly forming WBL on the surface, as the condition is mild under reduced pressure. Further, it is considered that in the case of treatment by a reactive gas such as oxygen, in addition to the above-mentioned mechanism, active species in the plasma will react, whereby polar groups will be introduced on the treated surface.

Further, since the amount of WBL significantly influences the bonding property and the adhesion property as mentioned above, the present inventors have considered that the amount of WBL may be applied to an evaluation of the bonding property or the adhesion property of the surface-treated ETFE film, and devised a method for analyze the amount of fluorine transferred to an aluminum thin plate, as a method for quantitatively evaluate the amount of WBL.

Now, the amount of fluorine transferred will be explained. When a fluororesin film such as an ETFE film is hot-pressed with a substrate, WBL present on the surface of the film will easily be transferred on the substrate. The amount transferred varies depending upon the pressing temperature, the surface pressure or the type of the substrate to be hot-pressed. To analyze the amount of WBL in the ETFE film, it is suitable to use an aluminum thin plate as a substrate, and to press under condition of a surface pressure of 21 kgf/cm$^2$ and a pressing temperature of 100° C. The amount of WBL can be evaluated by the total amount of fluorine atoms attached on the surface of the aluminum thin plate. The amount of fluorine transferred is defined as the ratio of the amount of fluorine atoms to the amount of aluminum atoms (atomic weight of fluorine [atomic %]/atomic weight of aluminum [atomic %]) based on the analyzed value of composition on the surface of the aluminum thin plate by ESCA measurement.

In the present invention, the amount of fluorine atoms present on the surface of an aluminum thin plate obtained by hot-pressing the aluminum thin plate on the surface of the surface-treated ETFE film at 100° C. under a surface pressure of 21 kgf/cm$^2$ for 10 minutes, followed by cooling to room temperature and separation, is preferably at most one time of the amount of fluorine atoms present on the surface of an aluminum thin plate obtained by the above-mentioned hot-pressing of the above-mentioned aluminum thin plate on the surface of a surface-untreated ETFE film, followed by cooling to room temperature and separation.

Here, the amount of fluorine atoms present on the surface of aluminum after the separation, is the total amount of fluorine atoms contained in all molecules, high polymer molecules and compounds which contain fluorine, present on the surface of aluminum after separated from the ETFE film.

The surface roughness $R_a$ on the surface of the surface-treated film is also preferably at most the surface roughness $R_a$ of the surface of an untreated ETFE film.

The present inventors have further conducted extensive studies on the relation between the bonding strength or the adhesion strength of the surface-treated ETFE film, and the amount of fluorine atoms transferred on the surface of an aluminum thin plate, which was in contact with the film, by hot-pressing the aluminum thin plate on the treated surface of the surface-treated ETFE film under a surface pressure of 21 kgf/cm$^2$ at 100° C. for 10 minutes.

Figure 1:
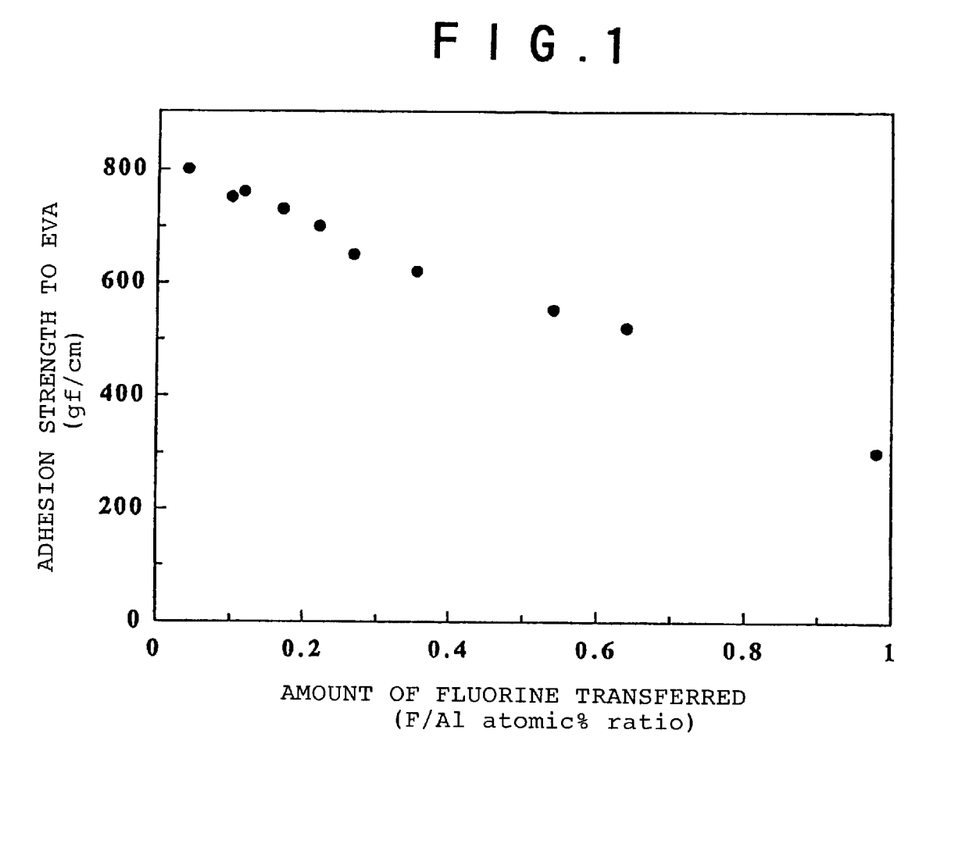
FIG. 1 is a figure illustrating the relation between the adhesion strength between an ETFE film and an ethylene-vinyl acetate copolymer (EVA) film, and the amount of fluorine transferred.

The relation between the adhesion strength between an ETFE film and an EVA film, and the amount of fluorine transferred on the surface of an aluminum thin plate, which was in contact with the ETFE film, by hot-pressing the aluminum thin plate on the treated surface of the surface-treated ETFE film under a surface pressure of 21 kgf/cm$^2$ at 100° C. for 10 minutes, is shown in FIG. 1.

As shown in FIG. 1, to obtain an adequate adhesion strength of an ETFE film having polar groups such as hydroxyl groups or carbonyl groups on the surface of the film, the amount of fluorine transferred is preferably about equal to or less than the untreated film. Namely, the adhesion strength between an ETFE film and an EVA film is controlled, not by the amount of functional groups, but by the amount of fluorine transferred, and the smaller the amount of fluorine transferred, the higher the adhesion strength, whereby the amount of fluorine transferred is preferably small.

The amount of fluorine transferred of an untreated film is about 0.2. Accordingly, the ETFE film of the present invention preferably has an amount of fluorine transferred of at most 0.2. A surface-treated ETFE film having an amount of fluorine transferred of at most 0.1, has a particularly excellent bonding strength and adhesion strength.

Figure 2:
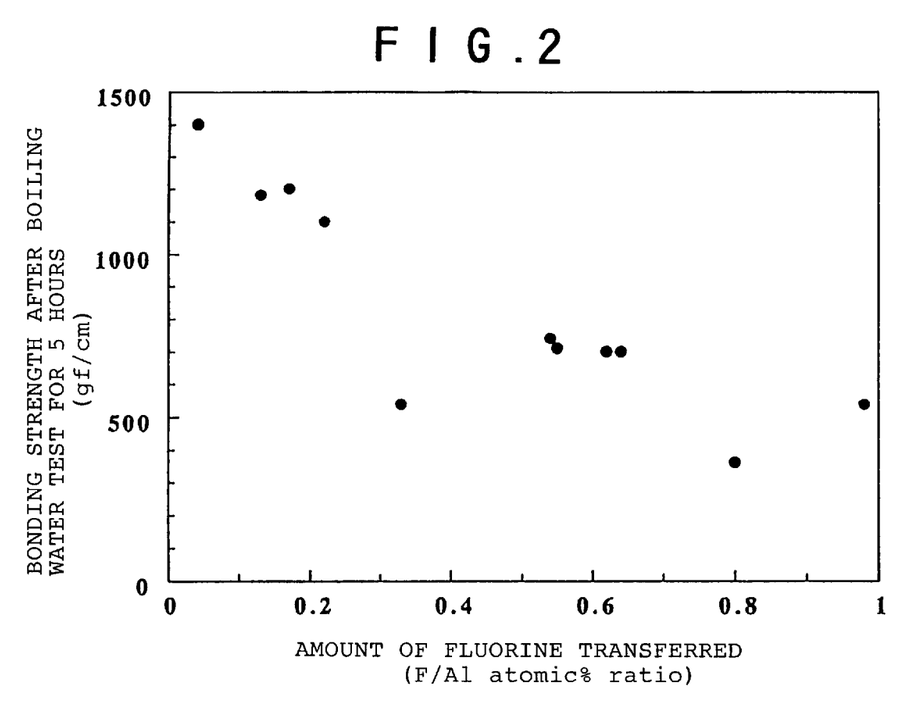
FIG. 2 is a figure illustrating the relation between the bonding strength between an ETFE film and a soft vinyl chloride film (hereinafter referred to simply as vinyl chloride), and the amount of fluorine transferred.

The relation between the bonding strength of a laminate obtained by lamination with vinyl chloride by using an adhesive (an adhesive containing a thermoplastic polyester resin component as the main component is used in this example) after boiling for 5 hours, and the amount of fluorine transferred, is shown in FIG. 2. As shown in FIG. 2, to obtain an ETFE film having oxygen-containing functional groups on the surface of the film, and having an adequate bonding strength with vinyl chloride (particularly a bonding strength maintained under conditions of high temperature and high humidity), the amount of fluorine transferred is also preferably small, the amount of fluorine transferred is particularly preferably about equal to or less than the untreated film, i.e. the amount of fluorine transferred is at most 0.2. Particularly, a surface-treated ETFE film having an amount of fluorine transferred of at most 0.1 has a very excellent bonding strength and adhesion strength.

The examples in FIG. 1 and FIG. 2 are examples of surface treatment by Ar gas. However, with respect to the relation between the bonding strength and the adhesion strength, and the amount of fluorine transferred, similar results can be obtained in a treatment by a gas containing another inert gas, oxygen gas, carbon dioxide gas or nitrogen gas, etc.

On the other hand, the amount of fluorine transferred of a film having a corona discharge treatment in the air applied thereto, is as large as 0.98, and a surface-treated film having a lower amount of fluorine transferred than the untreated film, can not be obtained. As large amount of WBL is present, even when hydrophilic groups (such as hydroxyl groups and carbonyl groups) are introduced by the surface treatment, and the wettability is improved, a durable bonding strength can not be obtained, and an adequate adhesion strength can not be obtained either. It is considered that by a conventional corona discharge surface treatment method in the air, the amount of WBL increases resulting from the surface treatment.

On the contrary, by the above-mentioned RF bombard treatment or DC bombard treatment under mild conditions under reduce pressure, a surface-treated ETFE film having an amount of fluorine transferred of at most 0.1 can be obtained, and a high bonding strength and an excellent adhesion strength can be obtained. This is considered to be attributable to the fact that the very mild RF or DC bombard treatment under reduced pressure functions to wash WBL on the surface.

Further, according to the present invention, a surface-treated ETFE film, wherein hydroxyl groups and carbonyl groups are present on the surface of the above-mentioned surface-treated film, and the surface roughness is at most 10 nm, can be provided.

The ETFE film of the present invention can easily be laminated with a so-called plastic sheet or film such as polyethylene, polypropylene, ABS, polystyrene, polyvinyl chloride, PET or acryl, by using an adhesive.

As the adhesive, a synthetic resin type adhesive represented by an epoxy type adhesive, a silicone type adhesive, a polyurethane type adhesive, a urea type adhesive, a melamine type adhesive, a phenol resin type adhesive, a vinyl acetate type adhesive or a cyanoacrylate type adhesive, may be mentioned. Further, an emulsion type adhesive represented by a vinyl acetate resin dispersed in e.g. water, a hot melt adhesive represented by an ethylene-vinyl acetate type or a polyamide type, or a synthetic rubber type adhesive represented by chloroprene rubber, may be mentioned. Further, an acryl type adhesive or a silicone type adhesive may be mentioned.

Further, by using the above-mentioned adhesive, the ETFE film can easily be laminated with a metal such as aluminum, a SUS plate, galvanium steel, galvanized steel or iron.

Further, by using the above-mentioned adhesive, the ETFE film can be laminated with a fluororesin such as ETFE or PFA (tetrafluoroethylene-perfluoro(alkoxyethylene) copolymer).

Among the above-mentioned adhesives, particularly effective is an adhesive containing a thermoplastic polyester resin component (hereinafter referred to as polyester type adhesive).

The thermoplastic polyester resin is one obtainable by dehydration-condensation reaction of a dibasic acid with a diol. The dibasic acid may, for example, be an aliphatic dibasic acid such as adipic acid, azelaic acid, sebacic acid, succinic acid or suberic acid, or an aromatic dibasic acid such as isophthalic acid, terephthalic acid, orthophthalic acid or naphthalene dicarboxylic acid. The diol may, for example, be ethylene glycol, diethylene glycol, 1,4-butanediol, 1,6-hexanediol or neopentyl glycol.

The above-mentioned thermoplastic polyester resin is synthesized by a dehydration-condensation reaction at a temperature of preferably about 240° C.

An additive may be used together with the thermoplastic polyester resin to improve properties as an adhesive. The additive may, for example, be a flow control agent such as benzoin or dimethylterephthalate.

Further, an isocyanate group-containing compound as a curing agent may be used together therewith to improve the bonding strength.

Further, to improve the bonding strength with fibrous substrate such as fabric, the polyester resin may undergo a urethane modification to increase the adhesion property.

Further, to bond the polyester type adhesive with both the surface-treated fluororesin and a metal, the polyester resin may undergo an epoxy modification.

The epoxy modification is carried out by carrying out the terminal epoxy modification (preferably by adding a predetermined amount of an epoxy resin such as bisphenol A type to the polyester resin followed by reaction at about 180° C.) after the polyester resin is synthesized. The epoxy modification is effective to improve the bonding strength to a metal, and extremely effective to improve boiling water resistance and chemical resistance.

The epoxy modification is carried out by adding an epoxy resin with a suitable amount to modify the terminal carboxyl groups of the preliminarily synthesized polyester resin to epoxy.

The preferred amount of the epoxy resin to be added varies depending upon the type of the substrate to be bonded to the above-mentioned ETFE film. For example, when the ETFE film is bonded to a metal, the epoxy resin may be added with an amount required to completely modify the terminal carboxyl groups of the polyester resin, or the epoxy resin with an excess amount may be added so that free epoxy resin which is not involved in the modification is present to such an extent that heat flow of the epoxy modified polyester resin is not prevented when the adhesive is heated. On the other hand, when the ETFE film is bonded to vinyl chloride, the degree of modification due to the epoxy resin may be slight, or there may be no modification (namely, the amount of the epoxy resin to be added to the polyester resin may be small or none). This is attributable to the fact that the epoxy resin swells by a plasticizer contained in vinyl chloride, whereby the cohesion strength tends to be low.

As the epoxy resin to be used for the epoxy modification, the above-mentioned bisphenol A type resin having a bisphenol skeleton, a hydrogenated bisphenol A type resin, a diol type resin having a bisphenol skeleton changed to a flexible methylene chain, a glycol type resin having a bisphenol skeleton changed to an ether chain, may, for example, be mentioned. By changing the skeleton structure of such an epoxy resin, the glass transition point of the adhesive when cured can optionally be changed.

An epoxy resin of bisphenol A type having an epoxy equivalent of at a level of from 500 to 1000, is particularly effective.

Further, a curing agent may be used together with the epoxy-modified polyester type adhesive or the urethane-modified polyester type adhesive. As the curing agent, a polyisocyanate having at least two isocyanate groups per molecule is preferably used. It may, for example, be an aromatic polyisocyanate such as tolylene diisocyanate, 4,4'-diphenylmethane diisocyanate or xylylene diisocyanate, an alicyclic polyisocyanate such as isophorone diisocyanate, or an aliphatic polyisocyanate such as hexamethylene diisocyanate. Further, an addition product, a biuret product or an isocyanurate product of the above-mentioned polyisocyanate with trimethylol propane may, for example, be mentioned. For a two pack type wherein a curing agent is used together, there is a pot life, and it is more preferred to use a so-called block isocyanate which dissociate at a high temperature to function as a curing agent.

Here, the method for producing the above-mentioned various thermoplastic polyester resins is not particularly limited to Examples as described hereinafter.

The thickness of the adhesive coated is preferably at least 3 μm as a coating thickness after dried. When an ETFE film having a thickness of less than 500 μm is laminated, it is suitably from 5 to 10 μm. Further, when a thick ETFE film having a thickness of at least 500 μm is bonded, the thickness of about 20 μm is preferred.

The method for lamination is not particularly limited. However, so-called dry laminate is suitable wherein a solvent is evaporated after the adhesive is coated on the film, followed by lamination. By making the films pass between nip rolls maintained to a temperature of at least a temperature at which the solvent is dried during the lamination, the bonding strength will further increase.

An additive such as a pigment, a leveling agent, a defoaming agent or an ultraviolet absorber, may be added to such an adhesive.

The present invention provides a process for producing a laminate, which comprises laminating an ETFE film having RF bombard treatment or DC bombard treatment applied to its surface, and another substrate, by a dry lamination method.

The present invention further provides a process for producing a laminate, which comprises coating an adhesive for lamination on an ETFE film having RF bombard treatment or DC bombard treatment applied to its surface, followed by drying the above-mentioned adhesive, and bonding another substrate with the above-mentioned surface-treated tetrafluoroethylene-ethylene copolymer film by the above-mentioned adhesive, for lamination by a dry lamination method.

Both sides of the ETFE film may be treated by the RF bombard treatment or the DC bombard treatment. In such a case, the adhesive may be coated only on the side to be bonded to another substrate.

The above-mentioned adhesive is preferably an adhesive containing a thermoplastic polyester resin component as the main component, from the same reason as mentioned above.

The above-mentioned bombard treatment is preferably a bombard treatment utilizing a gas which makes polar groups be present on the surface of the film after the bombard treatment, from the same reason as mentioned above.

As the substrate, a plastic sheet such as a vinyl chloride resin (including one other than a soft type), a polyester resin or a polyethylene resin, or a metal plate such as a SUS plate, a galvanized steel plate, a galvanium steel plate or an aluminum plate, may, for example, be preferably used.

Figure 7:
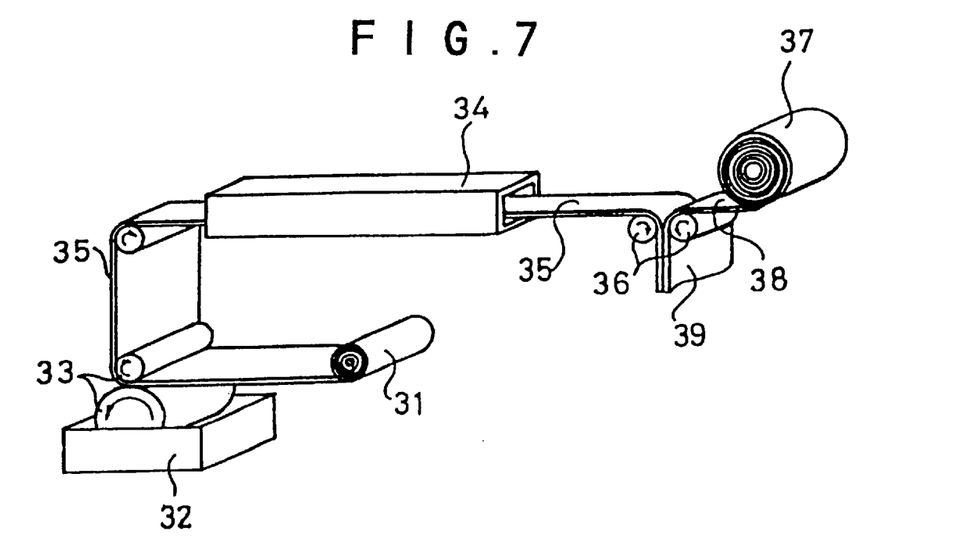
FIG. 7 is a schematic oblique view explaining an apparatus and a process for producing a laminate of an ETFE film with vinyl chloride.

At present, products obtained by laminating an ETFE film on a plastic sheet such as a vinyl chloride resin, a polyester resin or a polyethylene resin, may be available. However, products which are excellent in water resistance and moisture vapor resistance can not be available. This is attributable to the fact that by the surface treatment of the film, the above-mentioned WBL layer is formed on the film. According to the above-mentioned method for producing a laminate of the present invention, an ETFE film and a plastic film can be bonded with each other by a common dry lamination method, for example, as shown in FIG. 7. According to the method for producing a laminate of the present invention, lamination with a treatment rate of from 5 to 40 m/min can be carried out, and an adequate workability can be obtained.

It is preferred to make the films pass between nip rolls during the lamination. The linear pressure (lamination pressure by nip rolls) is preferably from 5 to 10 kgf/cm. The laminate thus produced preferably undergoes heat curing. However, an adequate bonding strength can be obtained with a room temperature curing at a level of 25° C. Further, the substrate to be laminated with the ETFE film by this lamination method, is not limited to plastic containing no fluorine represented by vinyl chloride, polyester, polypropylene or acryl, and various fluororesins may be laminated.

Further, as a method for laminating the ETFE film with a metal, a method for bonding the film on a metal plate of which the surface for bonding is increased by sandblast or by etching by chemicals, by heat melting at a temperature of at least the melting point, or a method of heat lamination at a temperature of at a level of from 70 to 230° C. by using an adhesive, is employed. The former method is a lamination method utilizing the fact that with regard to the ETFE laminate metal plate, the melting adhesion property of ETFE to the metal is excellent, and an excellent adhesion strength and boiling water resistance can be obtained. However, e.g. the blast apparatus or the etching apparatus tends to be large scaled, such being undesirable in view of cost. On the other hand, in the latter method, strong adhesion can be obtained at the time of lamination, by selecting a suitable adhesive. However, the WBL layer is newly formed on the surface of the fluoro film, by the surface treatment for adhesion, whereby a laminate which is excellent in boiling water resistance can not be prepared.

Figure 8:
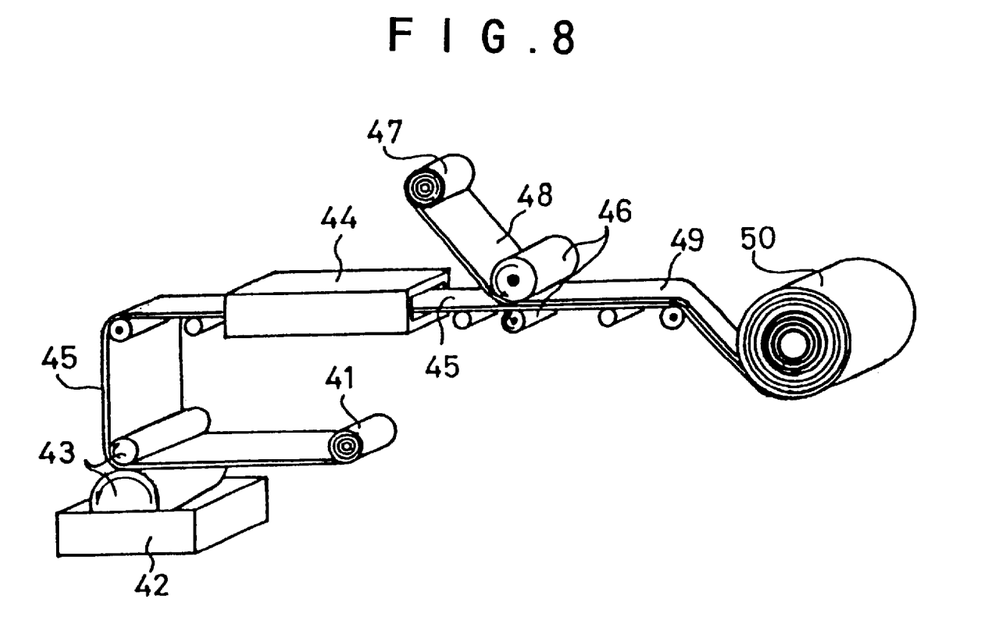
FIG. 8 is a schematic oblique view explaining an apparatus and a process for producing a laminate of an ETFE film with a stainless steel plate (hereinafter referred to simply as SUS plate).

On the contrary, according to the above-mentioned process for producing a laminate of the present invention, by a common dry lamination method, for example, as shown in FIG. 8, the bonding of an ETFE film with a metal plate can be made possible. According to this method, lamination with a treatment rate of from 5 to 40 m/min can be carried out and an adequate workability can be obtained. Further, a curing after the lamination is not required. It is preferred to make the films pass between nip rolls during the lamination. When the nip rolls are used in the above-mentioned method for producing a laminate, an ETFE film and a metal plate can be bonded with each other only by putting them between the nip rolls after the adhesive is coated on the metal plate followed by drying, and such is very excellent in mass production property. The linear pressure is preferably from 5 to 10 kgf/cm.

Further, in the case of using a polyester type adhesive as the adhesive in the above-mentioned process for producing a laminate, the adhesive adequately follows the extension of the ETFE film and the steel plate, during the folding process of the laminate. The substrate to be laminated with the ETFE film by this lamination method, may, for example, be a SUS plate, a galvanized steel plate, a galvanium steel plate or aluminum.

The laminate of the ETFE film with vinyl chloride is suitable for a wall material for unit bath, a wall material for coating booth or a wall paper, etc. The laminate of the ETFE film with stainless is suitable for a top plate of gas cooking tables or a range hood fan. The laminate of the ETFE film with aluminum is suitable for front panel for kitchen.

EXAMPLES

Now, Examples of the present invention will be explained.

Examples 1 to 15 and Comparative Examples 1 and 2

Figure 3:
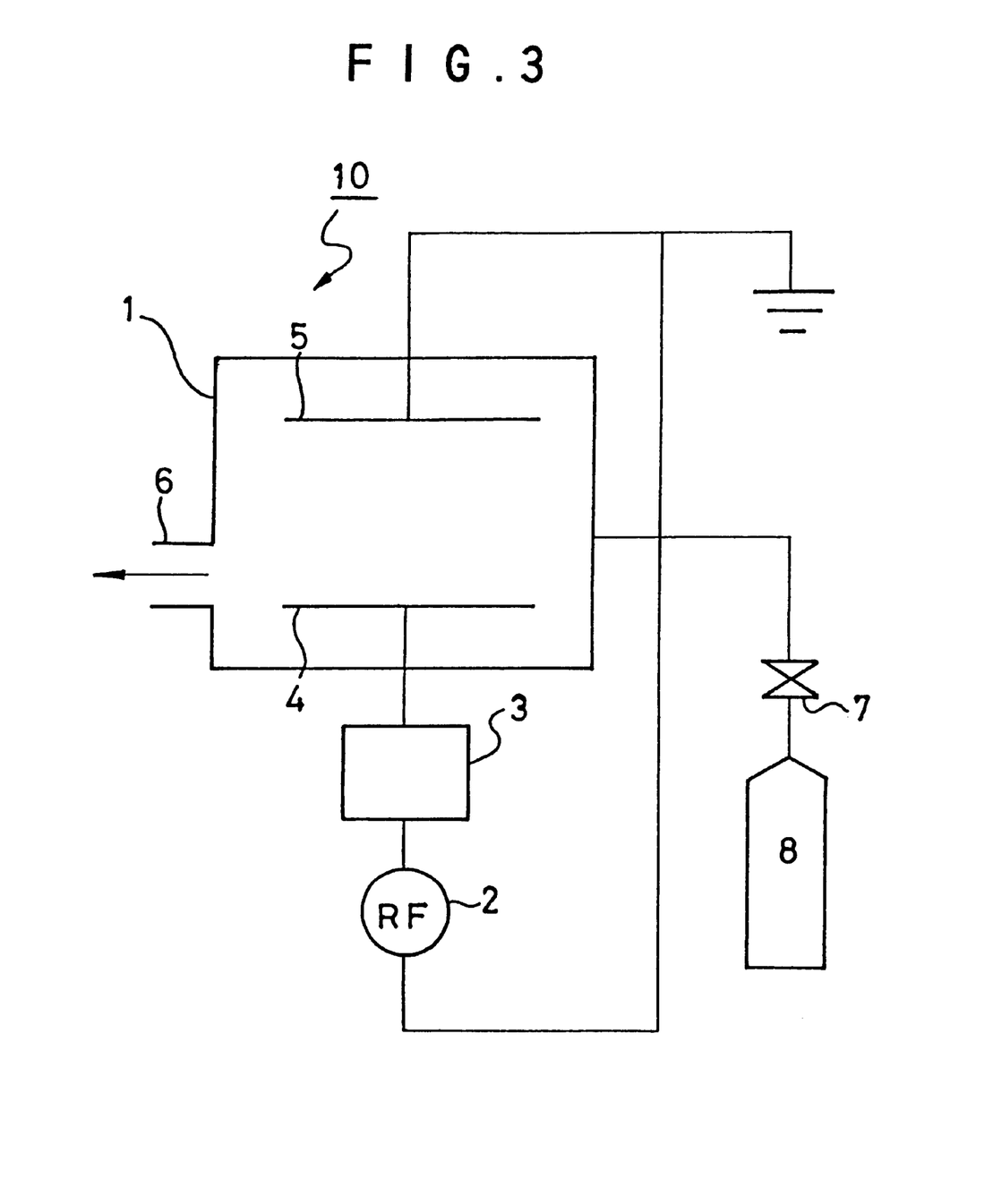
FIG. 3 is a schematic cross-sectional view explaining one example of an RF bombard apparatus to be used for the surface treatment of an ETFE film in the present invention.

FIG. 3 is a schematic cross-sectional view explaining an RF bombard apparatus 10 to be used for a surface treatment of an ETFE film in Examples 1 to 15 and Comparative Examples 1 and 2.

An electrode 4 and a counter electrode 5 were arranged to faced each other in a vacuum container 1. The counter electrode 5 was grounded, and the electrode 4 was connected with an RF power source 2 by means of a matching box 3. An atmosphere gas was supplied into the vacuum container 1 from a steel gas cylinder 8 by means of a valve 7 for introducing an atmosphere gas, and the vacuum container 1 was evacuated by a vacuum pump (not shown) by means of an air outlet 6, and the predetermined pressure was maintained. An ETFE film (tradename: AFLEX, manufactured by Asahi Glass Company Ltd., thickness: 50 μm) to be subjected to a surface treatment was placed either on the counter electrode (anode) 5 or on the electrode (cathode) 4. The distance between the electrode 4 and the counter electrode 5 was 4 cm. The atmosphere gas to be introduced into the vacuum container 1 was any of Ar, $CO_2$, $O_2$ or $N_2$. The pressure in the vacuum container 1 was any of 0.67 Pa, 6.7 Pa or 67 Pa. A radio frequency voltage of 13.56 MHz was applied between the electrode 4 and the counter electrode 5. The RF electrical power density was 0.16 W/cm². The treating time was any of 5, 30, 100 or 300 seconds. Under conditions as shown in Table 1, a surface-treated ETFE film was obtained in each of Examples 1 to 15. For the Comparative Examples, an ETFE film having a corona treatment (under a condition of 200 W·min/m² in the air, the same applies to the following corona treatments) applied thereto (Comparative Example 1) and a surface-untreated ETFE film (Comparative Example 2) were employed.

Then, as a dibasic acid, a dibasic acid comprising 50 mol % of terephthalic acid, 30 mol % of isophthalic acid and 20 mol % of suberic acid was prepared. As a diol, a diol comprising 30 mol % of ethylene glycol and 70 mol % of 1,4-butanediol was prepared. The dibasic acid and the diol were mixed with a molar ratio of about 1:1, followed by reaction at 240° C. for 10 hours, to obtain a polyester resin having a number average molecular weight of 30000. The polyester resin had an acid value of 3. Then, to 100 g of the polyester resin obtained in the above-mentioned reaction, 4 g of a bisphenol A type epoxy resin having an epoxy equivalent of 700, the amount of which was required for a terminal epoxy modification, was added, followed by reaction at 180° C. for 3 hours, to obtain a polyester resin having all terminal carboxyl groups undergone an epoxy modification. The resin was dissolved in methyl ethyl ketone, to prepare an adhesive having a solid content of 50%. Hereinafter the adhesive will be referred to as adhesive A.

On the other hand, by using 50 mol % of terephthalic acid, 30 mol % of isophthalic acid and 20 mol % of suberic acid, as dibasic acids, and 20 mol % of ethylene glycol and 80 mol % of neopentyl glycol, as diols, were reacted at 240° C. for 10 hours, to obtain a polyester resin having a number average molecular weight of 30000, and the resin was used as an adhesive B.

On each of ETFE films subjected to the surface treatment as mentioned above in Examples 1 to 15 and Comparative Examples 1 and 2, the adhesive A or B was coated by 50 μm applicator, followed by drying at 70° C. for 2 minutes to obtain an adhesive layer having a thickness of 15 μm as dried.

Then, the ETFE film and a transparent vinyl chloride (thickness: 200 μm) were laminated under a linear pressure of 10 kgf/cm. Here, the condition for bonding was such that the lamination was carried out at 120° C. for 1 second in the case of using the adhesive A, and at 70° C. for 1 second in the case of using the adhesive B.

After the lamination, a post-curing was carried out at 70° C. for 10 hours. Then, a T-peeling test was carried out at a peeling rate of 50 mm/min, whereupon bonding strength between the ETFE film and the transparent vinyl chloride under ordinary state (23° C.±2° C., relative humidity 50±5%) (hereinafter referred to as bonding strength under ordinary state) was measured with respect to each of Examples 1 to 15 and Comparative Examples 1 and 2.

Further, after the post-curing at 70° C. for 10 hours was carried out after the lamination, the laminate was subjected to boiling for 5 hours, and left to stand one day at room temperature. Then, a T-peeling test was carried out at a peeling rate of 50 mm/min, whereupon the bonding strength between the ETFE film and the transparent vinyl chloride (hereinafter referred to as bonding strength after boiling) was measured with respect to each of Examples 1 to 15 and Comparative Examples 1 and 2.

The results are shown in Table 1. In the Table, corona means a corona treatment, and the same applies hereinafter.

Table 1 shows results obtained when the adhesive A was employed. However, the same results were obtained when the adhesive B was employed.

TABLE 1

| | Conditions for treatment | | | | | Bonding strength | |
|---|---|---|---|---|---|---|---|
| | Type of gas | Treatment pressure [Pa] | Film-placed electrode | Distance between the electrodes [mm] | Treatment time [sec] | Under ordinary state [gf/cm] | After boiling [gf/cm] |
| Examples | | | | | | | |
| 1 | Ar | 0.67 | Anode | 40 | 30 | 1500 | 1490 |
| 2 | Ar | 6.7 | Anode | 40 | 30 | 1510 | 1480 |
| 3 | Ar | 67 | Anode | 40 | 30 | 1490 | 1470 |
| 4 | Ar | 0.67 | Cathode | 40 | 30 | 1530 | 1500 |
| 5 | Ar | 6.7 | Cathode | 40 | 30 | 1550 | 1510 |
| 6 | Ar | 67 | Cathode | 40 | 30 | 1540 | 1510 |
| 7 | Ar | 6.7 | Cathode | 40 | 5 | 1530 | 1510 |
| 8 | Ar | 6.7 | Cathode | 40 | 100 | 1500 | 1460 |
| 9 | Ar | 6.7 | Cathode | 40 | 300 | 1410 | 1380 |
| 10 | $O_2$ | 0.67 | Cathode | 40 | 30 | 1480 | 1490 |
| 11 | $O_2$ | 6.7 | Cathode | 40 | 30 | 1420 | 1400 |
| 12 | $CO_2$ | 0.67 | Cathode | 40 | 30 | 1500 | 1490 |
| 13 | $CO_2$ | 6.7 | Cathode | 40 | 30 | 1490 | 1490 |
| 14 | $N_2$ | 0.67 | Cathode | 40 | 30 | 1530 | 1540 |
| 15 | $N_2$ | 6.7 | Cathode | 40 | 30 | 1490 | 1460 |
| Comp. Exs. | | | | | | | |
| 1 | Corona | — | — | — | — | 1200 | 700 |
| 2 | Untreated | — | — | — | — | 50 | 5 |

As evident from Table 1, in each of Examples 1 to 15 of the present invention, an excellent bonding property could be obtained. Further, it is apparent that in each of Examples 1 to 15, even after boiling, an excellent bonding property could be maintained. On the other hand, in Comparative Examples 1 wherein the corona treatment was applied, particularly the bonding strength after boiling was low, and in Comparative Example 2 wherein the ETFE film was untreated, both bonding strengths under ordinary state and after boiling were low.

Examples 16 to 30 and Comparative Examples 3 and 4

On the treated surface of each of ETFE films (15 cm×8 cm) obtained by the surface treatment in the same manner as in Examples 1 to 15, the same size of EVA (an ethylene-vinyl acetate copolymer having a vinyl acetate content of 6 wt %, having 700 ppm of a hindered amine type light stabilizer, 500 ppm of a heat stabilizer and 3000 ppm of an ultraviolet absorber added thereto, and having a thickness of 470 μm) film was pressed by a metal press preliminarily set at 145° C., under a surface pressure of 10 kgf/cm² for 15 minutes, for lamination. After the lamination, the temperature was cooled to room temperature, a T-peeling test was carried out at a peeling rate of 50 mm/min, whereupon adhesive strength between the ETFE film and the EVA film was measured. In the same manner, adhesion strength between the ETFE film having a corona treatment applied thereto and the EVA film (Comparative Example 3) and an adhesion rate between a surface-untreated ETFE film and the EVA film (Comparative Example 4) were measured. The results are shown in Table 2.

As evident from Table 2, in each of Examples 16 to 30 of the present invention, an excellent adhesion strength could be obtained. On the contrary, in each of Comparative Examples 3 and 4, the adhesion strength was low.

Examples 31 to 45

Figure 4:
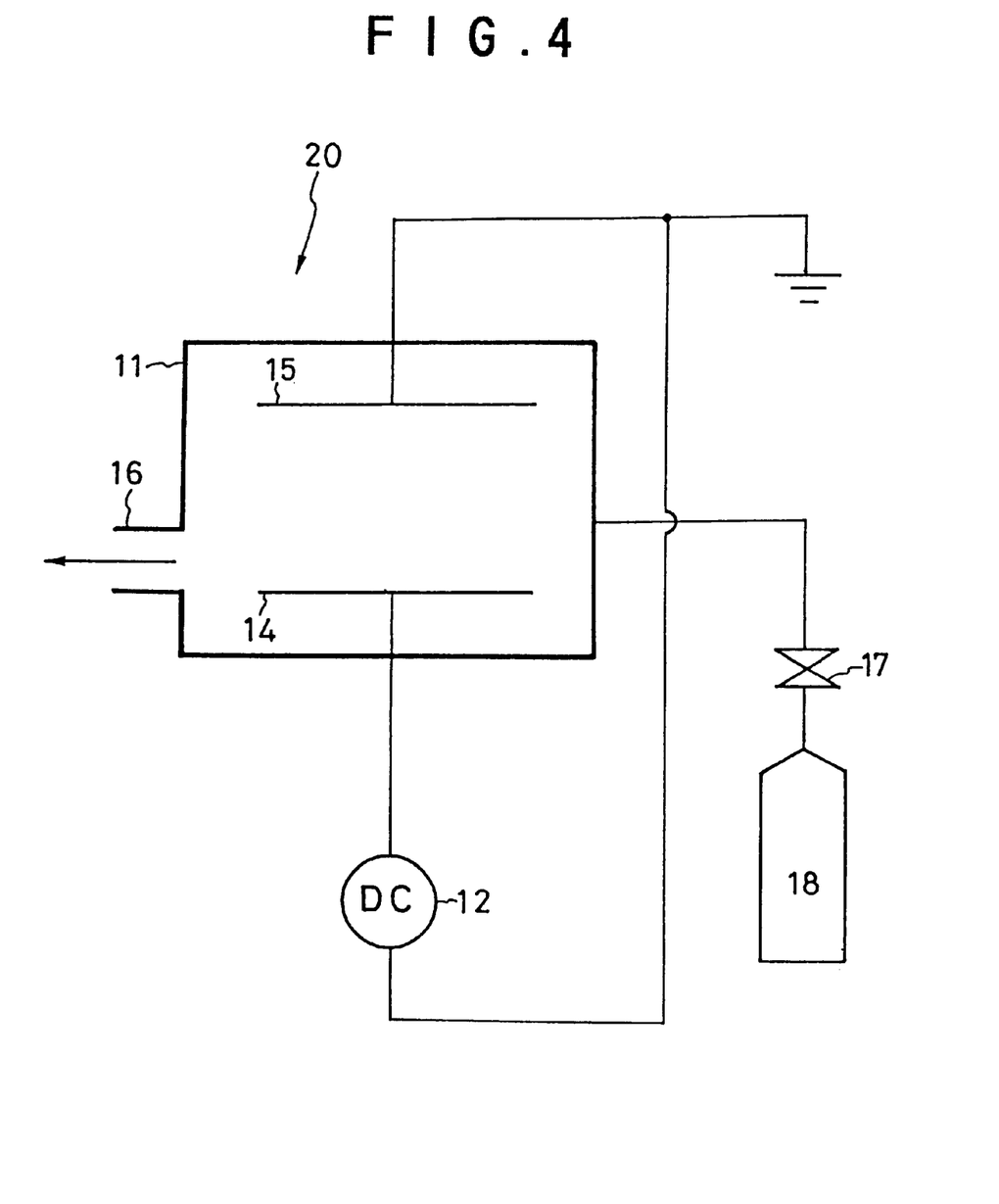
FIG. 4 is a schematic cross-sectional view explaining one example of a DC bombard apparatus to be used for the surface treatment of an ETFE film in the present invention.

In FIG. 4 is a schematic cross-sectional view explaining a DC bombard apparatus 20 to be used for a surface treatment of an ETFE film in Examples 31 to 45.

An electrode 14 and a counter electrode 15 were arranged so that they faced each other, in a vacuum container 11. The counter electrode 15 was grounded, and the electrode 14 was connected with a DC power source 12. An atmosphere gas was supplied into the vacuum container 11 from a steel gas cylinder 18 by means of a valve 17 for introducing an atmosphere gas, and the vacuum container 11 was evacuated by a vacuum pump (not shown) by means of an air outlet 16, whereby a predetermined pressure was maintained. An ETFE film (tradename: AFLEX, manufactured by Asahi Glass Company Ltd., thickness: 50 μm) to be subjected to a surface treatment, was placed either on the counter electrode (anode) 15 or on the electrode (cathode) 14. The distance between the electrode 14 and the counter electrode 15 was 4 cm. The atmosphere gas to be introduced to the vacuum container 11 was any of Ar, $CO_2$, $O_2$ or $N_2$. The pressure in the vacuum container 1 was any of 0.67 Pa, 6.7 Pa or 67 Pa. A direct current voltage was applied between the electrode 14 and the counter electrode 15. The DC electric power density was 0.16 W/cm². The treatment time is any of 5, 30,

TABLE 2

| | | Conditions for treatment | | | | |
|---|---|---|---|---|---|---|
| | Type of gas | Treatment pressure [Pa] | Film-placed electrode | Distance between the electrodes [mm] | Treatment time [sec] | EVA adhesion strength [gf/cm] |
| Examples | | | | | | |
| 16 | Ar | 0.67 | Anode | 40 | 30 | 790 |
| 17 | Ar | 6.7 | Anode | 40 | 30 | 750 |
| 18 | Ar | 67 | Anode | 40 | 30 | 740 |
| 19 | Ar | 0.67 | Cathode | 40 | 30 | 810 |
| 20 | Ar | 6.7 | Cathode | 40 | 30 | 820 |
| 21 | Ar | 67 | Cathode | 40 | 30 | 800 |
| 22 | Ar | 6.7 | Cathode | 40 | 5 | 810 |
| 23 | Ar | 6.7 | Cathode | 40 | 100 | 830 |
| 24 | Ar | 6.7 | Cathode | 40 | 300 | 720 |
| 25 | $O_2$ | 0.67 | Cathode | 40 | 30 | 800 |
| 26 | $O_2$ | 6.7 | Cathode | 40 | 30 | 790 |
| 27 | $CO_2$ | 0.67 | Cathode | 40 | 30 | 820 |
| 28 | $CO_2$ | 6.7 | Cathode | 40 | 30 | 800 |
| 29 | $N_2$ | 0.67 | Cathode | 40 | 30 | 790 |
| 30 | $N_2$ | 6.7 | Cathode | 40 | 30 | 760 |
| Comp. Exs. | | | | | | |
| 3 | Corona | — | — | — | — | 400 |
| 4 | Untreated | — | — | — | — | 20 |

100 or 300 seconds. Under conditions shown in Table 3, a surface-treated ETFE film was obtained in each of Examples 31 to 45.

The film was bonded to a transparent vinyl chloride by using the adhesive A or B in the same manner as in Example 1, and bonding strength under ordinary state and bonding strength after boiling were measured. The results are shown in Table 3.

Table 3 shows results obtained when the adhesive A was employed. However, the same results were obtained when the adhesive B was employed.

TABLE 3

| | Conditions for treatment | | | | Bonding strength | |
|---|---|---|---|---|---|---|
| Examples | Type of gas | Treatment pressure [Pa] | Film-placed electrode | Distance between the electrodes [mm] | Treatment time [sec] | Under ordinary state [gf/cm] | After boiling [gf/cm] |
| 31 | Ar | 0.67 | Anode | 40 | 30 | 1500 | 1460 |
| 32 | Ar | 6.7 | Anode | 40 | 30 | 1480 | 1470 |
| 33 | Ar | 67 | Anode | 40 | 30 | 1500 | 1470 |
| 34 | Ar | 0.67 | Cathode | 40 | 30 | 1510 | 1470 |
| 35 | Ar | 6.7 | Cathode | 40 | 30 | 1500 | 1460 |
| 36 | Ar | 67 | Cathode | 40 | 30 | 1480 | 1460 |
| 37 | Ar | 6.7 | Cathode | 40 | 5 | 1490 | 1450 |
| 38 | Ar | 6.7 | Cathode | 40 | 100 | 1500 | 1460 |
| 39 | Ar | 6.7 | Cathode | 40 | 300 | 1500 | 1460 |
| 40 | $O_2$ | 0.67 | Cathode | 40 | 30 | 1500 | 1480 |
| 41 | $O_2$ | 6.7 | Cathode | 40 | 30 | 1460 | 1430 |
| 42 | $CO_2$ | 0.67 | Cathode | 40 | 30 | 1470 | 1460 |
| 43 | $CO_2$ | 6.7 | Cathode | 40 | 30 | 1480 | 1500 |
| 44 | $N_2$ | 0.67 | Cathode | 40 | 30 | 1510 | 1470 |
| 45 | $N_2$ | 6.7 | Cathode | 40 | 30 | 1450 | 1450 |

As evident from Table 3, in each of Examples 31 to 45 of the present invention, an excellent bonding property could be obtained. Further, it is apparent that in each of Examples 31 to 45, even after boiling, an excellent bonding property could be maintained.

Examples 46 to 60

Each of ETFE films obtained by the surface treatment in the same manner as in Examples 31 to 45, was laminated with an EVA film in the same manner as in Example 16, to carry out Examples 46 to 60. The adhesion strength of a laminate film thus obtained was measured, and the results are shown in Table 4.

TABLE 4

| | Conditions for treatment | | | | | |
|---|---|---|---|---|---|---|
| Examples | Type of gas | Treatment pressure [Pa] | Film-placed electrode | Distance between the electrodes [mm] | Treatment time [sec] | EVA adhesion strength [gf/cm] |
| 46 | Ar | 0.67 | Anode | 40 | 30 | 730 |
| 47 | Ar | 6.7 | Anode | 40 | 30 | 720 |
| 48 | Ar | 67 | Anode | 40 | 30 | 750 |
| 49 | Ar | 0.67 | Cathode | 40 | 30 | 800 |
| 50 | Ar | 6.7 | Cathode | 40 | 30 | 780 |

TABLE 4-continued

| | Conditions for treatment | | | | | |
|---|---|---|---|---|---|---|
| Examples | Type of gas | Treatment pressure [Pa] | Film-placed electrode | Distance between the electrodes [mm] | Treatment time [sec] | EVA adhesion strength [gf/cm] |
| 51 | Ar | 67 | Cathode | 40 | 30 | 800 |
| 52 | Ar | 6.7 | Cathode | 40 | 5 | 800 |
| 53 | Ar | 6.7 | Cathode | 40 | 100 | 780 |
| 54 | Ar | 6.7 | Cathode | 40 | 300 | 750 |

TABLE 4-continued

| | Conditions for treatment | | | | | |
|---|---|---|---|---|---|---|
| Examples | Type of gas | Treatment pressure [Pa] | Film-placed electrode | Distance between the electrodes [mm] | Treatment time [sec] | EVA adhesion strength [gf/cm] |
| 55 | $O_2$ | 0.67 | Cathode | 40 | 30 | 750 |
| 56 | $O_2$ | 6.7 | Cathode | 40 | 30 | 770 |
| 57 | $CO_2$ | 0.67 | Cathode | 40 | 30 | 800 |
| 58 | $CO_2$ | 6.7 | Cathode | 40 | 30 | 830 |
| 59 | $N_2$ | 0.67 | Cathode | 40 | 30 | 750 |
| 60 | $N_2$ | 6.7 | Cathode | 40 | 30 | 740 |

As shown in Table 4, it is apparent that in each of Examples 46 to 60 of the present invention, an excellent adhesion strength could be obtained.

Examples 61 to 65 and Comparative Examples 5, 6 and 7

Then, functional groups on the surface of the surface-treated ETFE film were studied. The functional groups on the surface were identified by an ESCA method and a chemical modification method.

In the ESCA method, $O_{1S}$ and $C_{1S}$ peaks on the surface of the surface-treated ETFE film were measured, and the functional groups were identified by the chemical shift. For the measurement of the chemical shift, peaks were subjected to fitting by Gauss-Lorenz function to separate into each component, and each functional group was identified by the chemical shift of each separated component. The correspondence between the chemical shift and the functional groups was carried out by calculating the orbital energy of a unit structural molecule by a molecular orbital method (ab-initio method).

In the chemical modification method, a reagent gas containing hetero atoms which selectively react with specific functional groups was adhered on the surface of the surface-treated ETFE film by a reaction, and the presence or absence of hetero atoms on the surface of the ETFE film was measured by ESCA, whereupon the presence or absence of the specific functional groups was analyzed.

Identification of the hydroxyl groups was carried out in such a manner that the surface-treated ETFE film was contacted with a vapor of $(CClF_2CO)_2O$ (chlorodifluoroacetate anhydride) for 4 hours, followed by washing with ethanol, the surface of the washed ETFE film was analyzed by ESCA, and the presence or absence of Cl on the surface was observed. When the hydroxyl groups were present on the surface, the reaction:

—OH+$(CClF_2CO)_2O$→—O—COCClF$_2$+CClF$_2$COOH would take place, and accordingly Cl would be present on the surface of the ETFE film even after washed with ethanol.

Identification of the carbonyl groups was carried out in such a manner that the surface-treated ETFE film was contacted with a vapor of hydrazine aqueous solution (1:1) for 4 hours, the surface of the ETFE film was analyzed by ESCA, and the presence or absence of N on the surface was observed. When the carbonyl groups were present on the surface, the reaction:

RR'C=O+$(H_2N)_2$→RR'C=N—NH$_2$ wherein each of R and R' which are independent of each other, is an alkyl group or hydrogen, would take place, and accordingly N would be present on the surface of the ETFE film.

Figure 5:
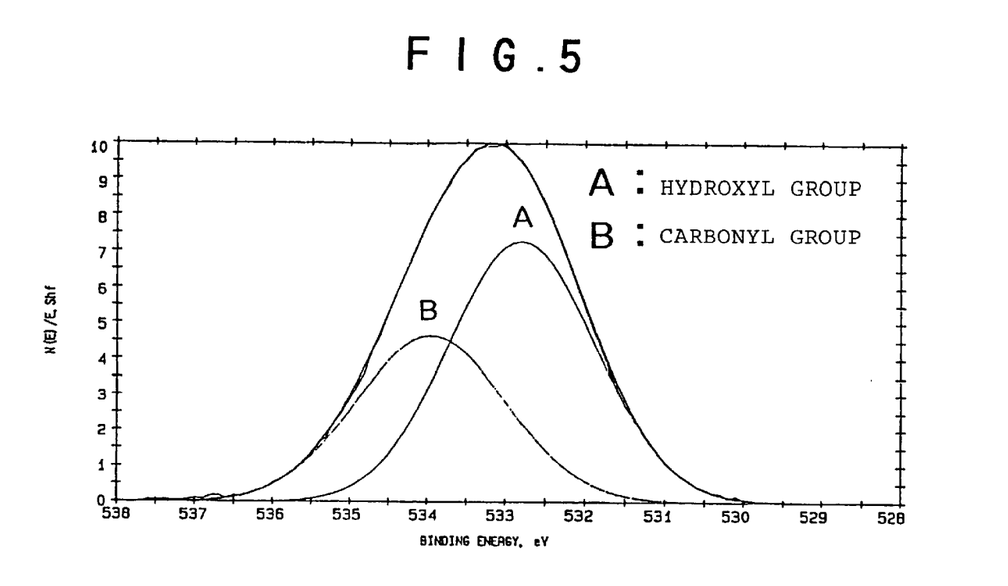
FIG. 5 is a figure illustrating ESCA spectra on the surface of a surface-treated ETFE film of the present invention.
Figure 6:
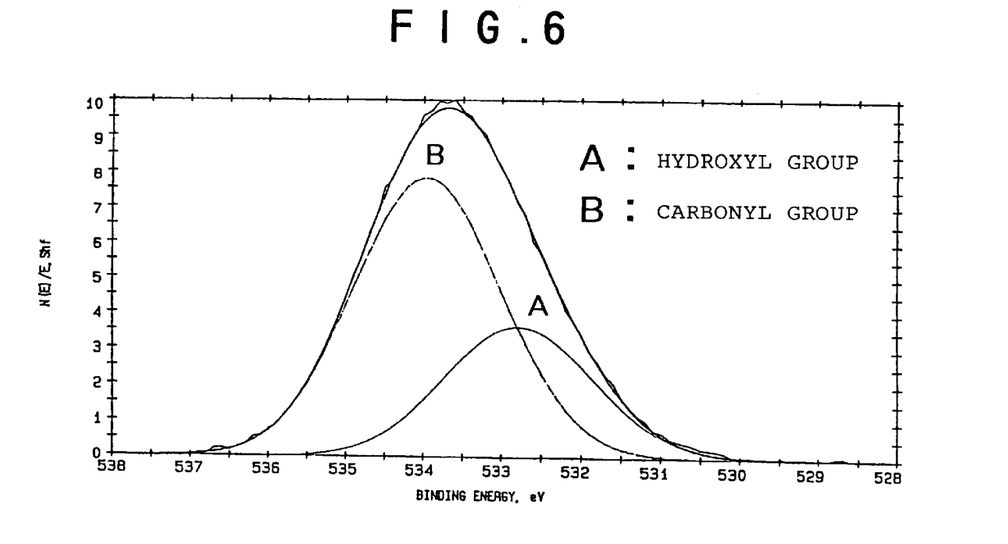
FIG. 6 is a figure illustrating ESCA spectra on the surface of an ETFE film which is subjected to a corona discharge treatment.

By carrying out the surface treatment of an ETFE film in the same manner as in Example 2, an ETFE film of the Example 61 was obtained. The surface of the ETFE film was measured by ESCA, and the results are shown in FIG. 5. Further, as a comparison, the surface of a corona-treated film (Comparative Example 5) was measured by ESCA, and the results are shown in FIG. 6. Both were $O_{1S}$ spectra. The peak top of each of these peaks was within a binding energy range of from 533 to 534 eV. Then, each peak was subjected to fitting by Gauss-Lorenz function to separate into components A and B, and functional groups were identified from the chemical shift of respective separated components. The peak A and the peak B were estimated to be attributable to hydroxyl groups and carbonyl groups, respectively.

Then, functional groups of each of films in Examples 62, 63, 64 and 65 obtained by carrying out the surface treatment of an ETFE film in the same manner as in Examples 2, 11, 13 and 15, respectively, and corona-treated film (Comparative Example 6) was identified by the chemical modification method. To confirm the presence or absence of influences by physical adsorption, the identification was carried out also with respect to a surface-untreated ETFE film (Comparative Example 7). The results are shown in Table 5. In Table 5, a case where hetero atoms of the reaction reagent were detected, is represented by "◯", and a case where they were not detected, is represented by "—".

TABLE 5

| Reaction reagent | Reaction functional group | Ex. 62 | Ex. 63 | Ex. 64 | Ex. 65 | Comp. Ex. 6 | Comp. Ex. 7 |
|---|---|---|---|---|---|---|---|
| $(CClF_2CO)_2O$ | Hydroxyl group | ◯ | ◯ | ◯ | ◯ | — | — |
| Hydrazine | Carbonyl group | ◯ | ◯ | ◯ | ◯ | ◯ | — |

The ETFE films of Examples 62, 63, 64 and 65, and ETFE films of the Comparative Examples 6 and 7, were contacted with a vapor of $(CClF_2CO)_2O$ for 4 hours, followed by washing with ethanol, and the surfaces of the washed ETFE films were analyzed by ESCA, to observe the presence or absence of Cl on the surfaces of the films. As a result, Cl was detected on the ETFE films of Examples 62, 63, 64 and 65, whereby it became apparent that hydroxyl groups were present on the surfaces of the ETFE films of Examples 62, 63, 64 and 65. On the surfaces of the ETFE films of Comparative Examples 6 and 7, no detectable amount of hydroxyl groups was present.

Further, the ETFE films of Examples 62, 63, 64 and 65 and ETFE films of Comparative Examples 6 and 7, were contacted with a vapor of a hydrazine aqueous solution (1:1) for 4 hours, and the surfaces of the ETFE films were analyzed by ESCA, to observe the presence or absence of N on the surfaces. As a result, N was detected on the ETFE films of Examples 62, 63, 64 and 65 and the ETFE film of Comparative Example 6, whereby it became apparent that carbonyl groups were present on the surfaces of the ETFE films of Examples 62, 63, 64 and 65 and the ETFE film of Comparative Example 6. On the surface of the ETFE film of Comparative Example 7, no detectable amount of carbonyl groups was present.

The ETFE film of Comparative Example 7 was not modified at all by the chemical modifications by either reagent. Accordingly, any of hydroxyl groups and carboxyl groups detected on the ETFE films of Examples 62, 63, 64 and 65, and carboxyl groups detected on the ETFE film of Comparative Example 6, were not attributable to the physical adsorption of the reagent.

The apparatus to be used for the measurement by ESCA was Model 5500 manufactured by PHI. As the X-ray source, homogeneous AlKa-rays were employed with 14 kV at 500 W. The X-ray irradiated area was 7 mm×2 mm, the analysis area (photo-electron detection area) was 0.8 mmφ, the photo-electron detection angle was 70°, the neutral electron rays energy was 0.1 eV, and the Pass Energy of the photo-electron was 23.5 eV.

Examples 66 to 70 and Comparative Examples 8 and 9

Then, the relation between the bonding strength and conditions of surface irregularities of the surface-treated ETFE film was studied.

By applying a surface treatment to ETFE films in the same manner as in Examples 1, 2, 10, 12 and 14, ETFE films of Examples 66, 67, 68, 69 and 70 were obtained, respectively. Further, as a comparison, ETFE films of an ETFE film having a corona treatment applied thereto (Comparative Example 8) and an ETFE film having no surface treatment applied thereto (Comparative Example 9) were prepared. With respect to each of the above ETFE films, $R_a$ was measured by using AFM at non-contact movement dynamic mode, and the results are shown in Table 6.

TABLE 6

|  | Surface roughness | Bonding strength under ordinary state [gf/cm] | Bonding strength after boiling [gf/cm] | EVA adhesion strength [gf/cm] |
|---|---|---|---|---|
| Ex. 66 | 6.7 nm | 1520 | 1470 | 800 |
| Ex. 67 | 9.6 nm | 1460 | 1460 | 810 |
| Ex. 68 | 8.4 nm | 1500 | 1470 | 780 |
| Ex. 69 | 9.2 nm | 1470 | 1500 | 750 |
| Ex. 70 | 10.0 nm | 1530 | 1440 | 830 |
| Comp. Ex. 8 | 20.3 nm | 1150 | 650 | 410 |
| Comp. Ex. 9 | 13.0 nm | 30 | 5 | 30 |

$R_a$ of each of ETFE films in Examples 66 to 70 of the present invention was smaller than the surface-untreated ETFE film (Comparative Example 9). The surface treatment of the present invention did not roughen the surface of the films. This means that the surface treatment method of the present invention is a very uniform and mild treatment. The ETFE films in Examples 66 to 70 of the present invention provided excellent bonding strength and adhesion strength. The surfaces of the ETFE films in Examples 66 to 70 were not under significantly irregular conditions (corn-like projections were not formed), and the crystalline structure under the surface-untreated state was not impaired. The bonding strength and the adhesion strength were measured in the same manner as in Example 1 and Example 16, respectively.

Example 71

FIG. 7 is a schematic oblique view explaining an apparatus and a process for producing a laminate of an ETFE film with a vinyl chloride film. In the production apparatus, on an ETFE film 35 supplied from an ETFE film roll 31, an adhesive in an adhesive chamber 32 was coated by gravure rolls 33. Then, the adhesive was dried in a drying furnace 34, and the ETFE film 35 having the adhesive as dried coated thereon and a vinyl chloride film 38 supplied from a vinyl chloride roll 37 were made to pass between nip rolls 36 for lamination, to produce a laminate 39.

The adhesive to be used in the present example was as same as the adhesive A to be used in Example 1.

Firstly, one side of an ETFE film having a thickness of 50 μm (tradename: AFLEX, manufactured by Asahi Glass Company Ltd.) Wag subjected to an RF bombard treatment. The conditions for treatment were as defined in the above-mentioned Example 2. On the surface subjected to the RF bombard treatment of the ETFE film 35 thus treated, the above-mentioned adhesive A was coated by the gravure rolls 33, followed by drying in the drying furnace 34 at 100° C., to obtain an adhesive layer having a thickness of 5 μm as dried.

Then, the ETFE film 35 having the dried adhesive layer and the vinyl chloride film 38 having a thickness of 200 μm were made to pass between the nip rolls 36 maintained at 130° C. for lamination, and the laminate of Example 61 was obtained. The linear pressure of the nip rolls 36 was 10 kgf/cm, and the lamination rate was 12 m/min. After being left to stand one day at room temperature, the laminate was subjected to a T-peeling test at a peeling rate of 20 mm/min, whereupon a bonding strength of 1530 gf/cm was obtained. Further, the test specimen was immersed in a boiling water for 5 hours, and subjected to a T-peeling test at a peeling rate of 20 mm/min, whereupon the bonding strength was 1490 gf/cm, thus indicating no decrease in the bonding strength.

Example 72

FIG. 8 is a schematic oblique view explaining an apparatus and a process for producing a laminate of an ETFE film with a SUS plate. In the production apparatus, an adhesive in an adhesive chamber 42 was coated on a SUS plate 45 supplied from a SUS plate roll 41 by gravure rolls 43. Then, the adhesive was dried by a drying furnace 44, and the SUS plate 45 having the adhesive as dried coated thereon and an ETFE film 48 supplied from an ETFE film roll 47 were made to pass between nip rolls 46 for lamination, to produce a laminate 49, which was finally wound to obtain a laminate roll 50.

In the present Example, fierily, one side of an ETFE film having a thickness of 50 μm (tradename: AFLEX, manufactured by Asahi Glass Company Ltd.) Wag subjected to an RF bombard treatment. The conditions for treatment were as defined in the above-mentioned Example 2. Then, the adhesive A prepared in Example 1 was coated on a SUS 430 plate 45 which was degreased by acetone, by gravure rolls 43, followed by drying in a drying furnace 44 at 200° C., to obtain an adhesive layer having a thickness of 5 μm as dried.

Subsequently, the ETFE film 48 which was subjected to the RF bombard treatment in the above-mentioned manner, and the SUS 430 plate 45 having the adhesive coated thereon, were made to pass between nip rolls 46 maintained at 120° C. for lamination, to produce a laminate 49. The linear pressure of the nip rolls 46 was 10 kgf/cm, and the lamination rate was 12 m/min. After being left to stand one day at room temperature, the laminate was subjected to a 180° peeling test at a peeling rate of 20 mm/min, whereupon the bonding strength of 1500 gf/cm was obtained. Further, the test specimen was immersed in a boiling water for 5 hours, and the bonding strength of 1440 gf/cm was obtained.

Examples 73 and 74

ETFE films of Examples 73 and 74 were obtained by carrying out the surface treatment on ETFE films by the DC bombard treatment in the same manner as in Examples 32 and 33, respectively. With respect to such films, functional groups on the surface were identified by using the peak shift of ESCA and the chemical modification method in the same manner as in Examples 61 and 62, whereupon it became apparent that hydroxyl groups and carbonyl groups were mainly present.

Then, with respect to the ETFE films of Examples 73 and 74, the bonding strength with a transparent vinyl chloride having a thickness of 200 μm was measured, by using the above-mentioned adhesive A, in the same manner as in Example 1. With the ETFE film of Example 73, a value of 1520 gf/cm was obtained, and with the ETFE film of Example 74, a value of 1490 gf/cm was obtained, each indicating a high bonding strength.

Further, by using the above-mentioned adhesive B, the bonding strength with a transparent vinyl chloride having a thickness of 200 μm was measured in the same manner as in Example 1. With the ETFE film of Example 73, a value of 1500 gf/cm was obtained, and with the ETFE film of Example 74, a value of 1470 gf/cm was obtained, each indicating a high bonding strength.

Example 75

One side of an ETFE film (tradename: AFLEX, manufactured by Asahi Glass Company Ltd.) having a thickness of 50 μm was subjected to a DC bombard treatment. The conditions for treatment were as defined in the above-mentioned Example 33. In the same manner as in Example 71, lamination with a vinyl chloride film was carried out, and a T-peeling test was carried out, whereupon a bonding strength of 1470 gf/cm was obtained. Further, the test specimen was immersed in a boiling water for 5 hours, and subjected to a T-peeling test, whereupon a bonding strength of 1460 gf/cm was obtained, thus indicating no decrease in bonding strength.

Example 76

One side of an ETFE film (tradename: AFLEX, manufactured by Asahi Glass Company Ltd.) having a thickness of 50 μm was subjected to a DC bombard treatment. The conditions for treatment were as defined in the above-mentioned Example 33. In the same manner as in Example 72, the ETFE film was laminated on an SUS plate to produce a laminate. After being left to stand for one day at room temperature, the laminate was subjected to a 180° peeling test at a peeling rate of 20 mm/min, whereupon a bonding strength of 1450 gf/cm was obtained. Further, the test specimen was immersed in a boiling water for 5 hours, whereupon a bonding strength of 1480 gf/cm was obtained.

Comparative Example 10

Firstly, one side of an ETFE film (tradename: AFLEX, manufactured by Asahi Glass Company Ltd.) having a thickness of 50 μm was subjected to a corona discharge treatment in the air. The above-mentioned adhesive A was coated on the surface by gravure rolls, followed by drying at 100° C. to obtain an adhesive layer having a thickness of 5 μm was dried. Then, the ETFE film subjected to the corona discharge treatment and a vinyl chloride film having a thickness of 200 μm were made to pass between nip rolls maintained at 110° C. for lamination. The linear pressure of the nip rolls was 10 kgf/cm, and the lamination rate was 12 m/min. After being left to stand for one day at room temperature, the laminate was subjected to a T-peeling test at a peeling rate of 20 mm/min, whereupon a bonding strength of 1170 gf/cm was obtained. However, after the laminate was immersed in a boiling water for 5 hours, the bonding strength was as low as 720 gf/cm.

Examples 77 to 90 and Comparative Examples 11 and 12

Now, the relation between the bonding strength and the amount of fluorine transferred of the ETFE film will be shown. In Examples 77, 78, 79 and 80, the surface treatment was carried out, and the bonding strength was measured, in the same manner as in Examples 1, 2, 4 and 5, respectively. In Examples 81, 82, 83 and 84, the surface treatment was carried out, and the bonding strength was measured, in the same manner as in 32, 33, 35 and 36, respectively. In Examples 85, 86, 87, 88, 89 and 90, the surface treatment was carried out, and the bonding strength was measured, in the same manner as in Examples 10, 11, 12, 13, 14 and 15, respectively. In Comparative Example 11, the surface treatment in the same manner as in Comparative Example 1 was carried out, and in Comparative Example 12, the surface was not treated. In Comparative Examples 11 and 12, the bonding strength was measured in the same manner as in Comparative Examples 1 and 2, respectively. An aluminum thin plate was hot-pressed on the surface of each of ETFE films of the above-mentioned Examples and Comparative Examples, at a heating temperature of 100° C. under a surface pressure of 21 kgf/cm for a pressing time of 10 minutes, followed by cooling to room temperature, and the ETFE film was separated off from the aluminum thin plate, whereupon the amount of fluorine transferred on the surface (the surface which was in contact with the ETFE film) of aluminum was measured. The bonding strength and values of the amount of fluorine transferred are shown in Table 7.

TABLE 7

| | Conditions for treatment | | Bonding strength | | Amount of fluorine transferred |
|---|---|---|---|---|---|
| | Type of gas | Method | Under ordinary state [gf/cm] | After boiling [gf/cm] | |
| Example 77 | Ar | RF bombard | 1510 | 1480 | 0.08 |
| Example 78 | Ar | RF bombard | 1490 | 1470 | 0.1 |
| Example 79 | Ar | RF bombard | 1550 | 1510 | 0.09 |
| Example 80 | Ar | RF bombard | 1540 | 1510 | 0.08 |
| Example 81 | Ar | DC bombard | 1480 | 1470 | 0.09 |
| Example 82 | Ar | DC bombard | 1500 | 1470 | 0.12 |
| Example 83 | Ar | DC bombard | 1500 | 1460 | 0.08 |
| Example 84 | Ar | DC bombard | 1480 | 1460 | 0.11 |
| Example 85 | $O_2$ | RF bombard | 1470 | 1480 | 0.09 |
| Example 86 | $O_2$ | RF bombard | 1460 | 1470 | 0.11 |
| Example 87 | $CO_2$ | RF bombard | 1560 | 1480 | 0.08 |
| Example 88 | $CO_2$ | RF bombard | 1500 | 1510 | 0.10 |
| Example 89 | $N_2$ | RF bombard | 1520 | 1490 | 0.08 |
| Example 90 | $N_2$ | RF bombard | 1540 | 1450 | 0.09 |
| Comparative Example 11 | | Corona treatment | 1200 | 700 | 0.98 |
| Comparative Example 12 | | Untreated | 50 | 5 | 0.2 |

As shown in Table 7, the amount of fluorine transferred of the ETFE film of the present invention was extremely small, and indicates a lower value than the value of the film having no surface treatment applied thereto (Comparative Example 12). Namely, the ETFE film having the RF bombard treatment or the DC bombard treatment applied thereto of the present invention, has a small amount of fluorine transferred to the surface of aluminum, and has an excellent bonding strength. On the contrary, the ETFE film having the corona discharge treatment applied thereto (Comparative Example 11) has a large amount of fluorine transferred, i.e. it has a large amount of fluorine transferred to the surface of aluminum, and is poor in bonding strength. As shown here, the bonding strength of the surface-treated ETFE film shows a high value when the amount of fluorine transferred is small.

INDUSTRIAL APPLICABILITY

According to the present invention, an ETFE film having an extremely excellent bonding strength and a laminate employing the ETFE film can be obtained.

Further, according to a process for producing a laminate of the present invention, a laminate of an ETFE film having an excellent bonding property with a plastic sheet such as vinyl chloride can be produced with a good mass production property.

Still further, according to the process for producing a laminate of the present invention, a laminate of an etfe film having an excellent bonding property with a metal plate such as sus can be produced with a good mass production property.

What is claimed is:

1. A surface-treated tetrafluoroethylene-ethylene copolymer film, wherein polar groups are present on the surface of said surface-treated film, and the surface roughness $R_a$ of the surface of the surface-treated film is at most the surface roughness $R_a$ of the surface of the same tetrafluoroethylene-ethylene copolymer film which has not been surface-treated and the amount of fluorine atoms present on the surface of an aluminum plate obtained by hot-pressing the aluminum plate on the surface of said surface-treated film at 100° C. under a surface pressure of 21 kgf/cm² for 10 minutes, followed by cooling to room temperature and separation, is at most one time of the amount of fluorine atoms present on the surface of an aluminum plate obtained by said hot-pressing of said aluminum plate on the surface of the same tetrafluoroethylene-ethylene copolymer film which has not been surface-treated followed by cooling to room temperature and separation.

2. The surface-treated tetrafluoroethylene-ethylene copolymer film according to claim 1, wherein hydroxyl groups and/or carbonyl groups are present as the polar groups.

3. A laminate which comprises a substrate and the surface-treated tetrafluoroethylene-ethylene copolymer film as defined in claim 1 laminated on a substrate so that the surface of the surface-treated film faces said substrate.

4. The laminate according to claim 3, which further has an adhesive for lamination between said substrate and said surface-treated tetrafluoroethylene-ethylene copolymer film, wherein said substrate and said surface-treated tetrafluoroethylene-ethylene copolymer film are bonded with each other by an adhesive.

5. The laminate according to claim 4, wherein the said adhesive is an adhesive which contains a thermoplastic polyester resin component as the main component.

6. A process for producing a laminate according to claim 3, which comprises laminating a tetrafluoroethylene-ethylene copolymer film having an RF bombard treatment or a DC bombard treatment applied to its surface, with another substrate, by a dry lamination method.

7. The process for producing a laminate according to claim 6, which comprises coating an adhesive for lamination on a tetrafluoroethylene-ethylene copolymer film having an RF bombard treatment or a DC bombard treatment applied to its surface, followed by drying said adhesive, and bonding another substrate and said tetrafluoroethylene-ethylene copolymer film after said treatment with said adhesive for lamination by a dry lamination method.

8. The process for producing a laminate according to claim 7, wherein said adhesive is an adhesive which contains a thermoplastic polyester resin component as the main component.

9. The process for producing a laminate according to claim 7, wherein said bombard treatment is a bombard treatment utilizing a gas which makes polar groups be present on the surface of the film having the bombard treatment applied thereto.

10. A surface-treated tetrafluoroethylene-ethylene copolymer film according to claim 1, prepared by an RF bombard treatment or a DC bombard treatment.

11. A surface-treated tetrafluoroethylene-ethylene copolymer film according to claim 10, wherein said RF bombard treatment or a DC bombard treatment is at an electric power density of from 0.01 to 0.5 W/cm².

* * * * *